(12) United States Patent
Lindoff et al.

(10) Patent No.: US 12,058,541 B2
(45) Date of Patent: Aug. 6, 2024

(54) APPARATUS AND METHOD FOR FLEXIBLE CONTROL CHANNEL MONITORING

(71) Applicant: Huawei Technologies Co., Ltd., Shenzhen (CN)

(72) Inventors: Bengt Lindoff, Lund (SE); Thorsten Schier, Lund (SE); Ruixiang Ma, Beijing (CN); Fei Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 615 days.

(21) Appl. No.: 17/192,555

(22) Filed: Mar. 4, 2021

(65) Prior Publication Data

US 2021/0195450 A1    Jun. 24, 2021

Related U.S. Application Data

(63) Continuation of application No. PCT/EP2020/053810, filed on Feb. 14, 2020.

(30) Foreign Application Priority Data

Aug. 14, 2019  (WO) ................ PCT/EP2019/071848

(51) Int. Cl.
| | |
|---|---|
| *H04W 24/08* | (2009.01) |
| *H04L 1/00* | (2006.01) |
| *H04L 5/00* | (2006.01) |
| *H04W 8/22* | (2009.01) |
| *H04W 8/24* | (2009.01) |

(Continued)

(52) U.S. Cl.
CPC ........... *H04W 24/08* (2013.01); *H04L 1/0038* (2013.01); *H04W 8/245* (2013.01); *H04W 72/0446* (2013.01); *H04W 72/23* (2023.01)

(58) Field of Classification Search
CPC . H04W 24/08; H04W 8/245; H04W 72/0446; H04W 72/23; H04W 8/22; H04W 72/51; H04L 1/0038; H04L 5/0053
See application file for complete search history.

(56) References Cited

U.S. PATENT DOCUMENTS

| | | |
|---|---|---|
| 2012/0099544 A1 | 4/2012 | Pajukoski et al. |
| 2019/0223164 A1 | 7/2019 | He et al. |

(Continued)

FOREIGN PATENT DOCUMENTS

| | | |
|---|---|---|
| CN | 109963326 A | 7/2019 |
| WO | 2018144899 A1 | 8/2018 |

(Continued)

OTHER PUBLICATIONS

3GPP TSG RAN WG1 Meeting #89, R1-1707162 (Year: 2017).*

(Continued)

*Primary Examiner* — Harry H Kim
(74) *Attorney, Agent, or Firm* — Leydig, Voit & Mayer, Ltd.

(57) ABSTRACT

A network node for performing control channel monitoring according to a first mode or a second mode, in particular for monitoring control channel elements (CCEs) and/or blind decodes (BDs), the network node being configured to obtain configuration information indicating the first mode and/or the second mode perform control channel monitoring based on the obtained configuration information.

32 Claims, 3 Drawing Sheets

(51) Int. Cl.
H04W 72/0446 (2023.01)
H04W 72/23 (2023.01)
H04W 72/51 (2023.01)

(56) References Cited

U.S. PATENT DOCUMENTS

| | | | |
|---|---|---|---|
| 2020/0169991 A1* | 5/2020 | Lin | H04W 72/56 |
| 2020/0329389 A1* | 10/2020 | Hosseini | H04W 8/24 |
| 2021/0168780 A1* | 6/2021 | Li | H04W 74/006 |
| 2021/0297997 A1* | 9/2021 | Hwang | H04W 76/28 |
| 2022/0264555 A1* | 8/2022 | Liu | H04W 72/0453 |
| 2023/0362944 A1* | 11/2023 | Marzban | H04W 72/0446 |

FOREIGN PATENT DOCUMENTS

| | | |
|---|---|---|
| WO | 2018228487 A1 | 12/2018 |
| WO | 2019021488 A1 | 1/2019 |
| WO | 2019021489 A1 | 1/2019 |
| WO | 2019029943 A1 | 2/2019 |

OTHER PUBLICATIONS

"3rd Generation Partnership Project; Technical Specification Group Radio Access Network; NR; Physical channels and modulation (Release 15)," 3GPP TS 38.211 V15.6.0, total 97 pages, 3rd Generation Partnership Project, Valbonne, France (Jun. 2019).

"3rd Generation Partnership Project; Technical Specification Group Radio Access Network; NR; Multiplexing and channel coding (Release 15)," 3GPP TS 38.212 V15.6.0, total 101 pages, 3rd Generation Partnership Project, Valbonne, France (Jun. 2019).

"3rd Generation Partnership Project; Technical Specification Group Radio Access Network; NR; Physical layer procedures for control (Release 15)," 3GPP TS 38.213 V15.6.0, total 107 pages, 3rd Generation Partnership Project, Valbonne, France (Jun. 2019).

"3rd Generation Partnership Project; Technical Specification Group Radio Access Network; NR; Physical layer procedures for data (Release 15)," 3GPP TS 38.214 V15.6.0, total 105 pages, 3rd Generation Partnership Project, Valbonne, France (Jun. 2019).

NTT Docomo, "RAN1 NR UE features," R1-1907862, total 52 pages (May 20, 2019).

NTT Docomo, "RAN1 NR UE features," R1-1903817, total 43 pages (Mar. 14, 2019).

"PDCCH monitoring for slots and mini-slots," 3GPP TSG RAN WG1 Meeting #89, R1-1707162, Total 4 pages, 3rd Generation Partnership Project, Valbonne, France (May 15-19, 2017).

Huawei, HiSilicon et al., "PDCCH enhancements for URLLC," 3GPP TSG RAN WG1 Meeting #97, Reno, USA, R1-1906057, Total 11 pages, 3rd Generation Partnership Project, Valbonne, France (May 13-17, 2019).

InterDigital Inc et al., "Views on potential physical layer enhancements for URLLC," 3GPP TSG RAN WG1 Meeting #94, Gothenburg, Sweden, R1-1809099, Total 3 pages, 3rd Generation Partnership Project, Valbonne, France (Aug. 20-24, 2018).

* cited by examiner

Figure 6 ns at any symbol during the slot but they should be within the limits of the UE's monitoring capability.

In other words, there should not be more monitoring occasions configured than what the UE can handle according to its capability.

Figure 1:
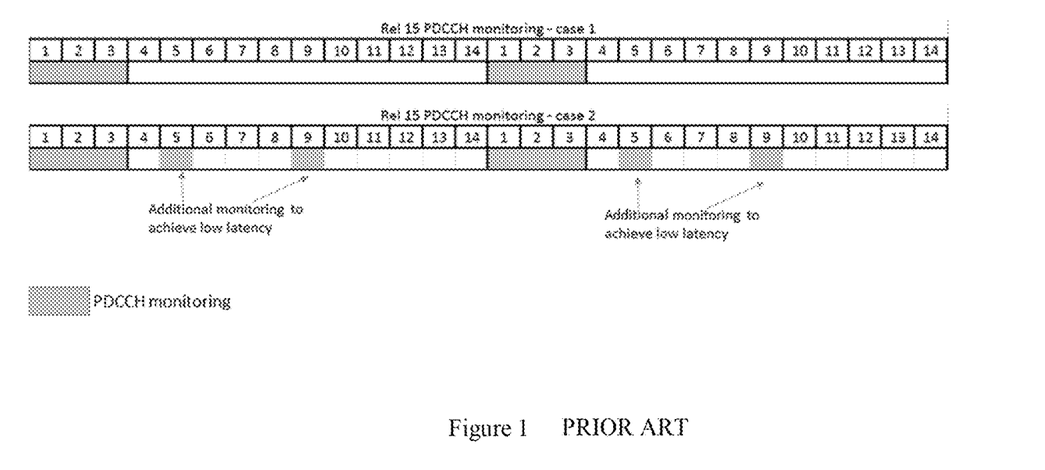
FIG. 1 illustrates examples of monitoring on the Physical Downlink Control Channel (PDCCH)

The two cases of PDCCH monitoring are illustrated in FIG. 1. In the upper part of the figure, there is only one monitoring span consisting of three symbols in the beginning of the slot. In the bottom part of the figure, there is also one monitoring span consisting of three symbols in the beginning of the slot, but there are additional monitoring occasions configured within the slot. In this case the UE needs to have the capability to perform control channel monitoring during other spans within the slot to be able to cover the configured monitoring occasions.

For the transmission of the control channel, such as the Physical Downlink Control Channel (PDCCH), the base station, such as a gNB, configures a client device, such as a UE, with search spaces consisting of multiple Control Channel Elements (CCEs). To identify the PDCCH, the UE performs blind detection, which includes channel estimation and blind decoding or decode (BD).

Both channel estimation and blind decoding consume computational resources in the UE. For Rel-15, 3GPP has therefore agreed on a maximum numbers of channel estimations on non-overlapping CCEs and blind decoding per slot that a UE has to be capable of to perform. These numbers are sub-carrier spacing dependent and are summarized in Table 1 below:

TABLE 1

Maximum number of channel estimations for non-overlapping CCEs and BDs per slot in Rel-15

| | SCS | | | |
|---|---|---|---|---|
| | 15 kHz | 30 kHz | 60 kHz | 120 kHz |
| Max number of non-overlapping CCEs per slot in Rel-15 | 56 | 56 | 48 | 32 |
| Max number of BDs per slot in Rel-15 | 44 | 36 | 22 | 20 |

APPARATUS AND METHOD FOR FLEXIBLE CONTROL CHANNEL MONITORING

CROSS-REFERENCE TO RELATED APPLICATIONS

This application is a continuation of International Application No. PCT/EP2020/053810, filed on Feb. 14, 2020, which claims priority to International Patent Application No. PCT/EP2019/071848, filed on Aug. 14, 2019. The disclosures of the aforementioned applications are hereby incorporated by reference in their entireties.

TECHNICAL FIELD

Embodiments of the present disclosure relate to the handling of the control channel monitoring as for example used in the 5G/NR communication system. In particular, embodiments of the present disclosure refer to a network node for performing control channel monitoring, to a scheduling network node and to corresponding methods.

BACKGROUND

The 5G cellular system, New Radio (NR) is currently being standardized. 5G/NR is intended for a variety of use cases with very different requirements. One application field mainly targeted during the Release 15 (Rel-15, e.g. 38.211-214 v15.6.0) specification is enhanced mobile broadband (eMBB). For the Release 16 (Rel-16) specification, new study-and work items have been defined. The goal was to identify the shortcomings in Rel-15 when being applied on other scenarios, e.g. on ultra-reliable low latency communication (URLLC). URLLC has basic support in Rel-15 but is going to be enhanced during the Rel-16 specification.

One critical component of low latency communication is frequent monitoring of the control channel, the more often the UE is monitoring the control channel, the less time it will waste until it can start its action (e.g. a reception of the PDSCH or a transmission of a PUSCH). Thus, frequent control channel monitoring reduces the overall latency, which is critical for URLLC applications.

Control Channel Monitoring Periodicity and Complexity

In Release 15 two types of control channel monitoring are defined. According to a first type monitoring, the control channel is only monitored during one period per slot. This period can consist of up to three orthogonal symbols (OS). A monitoring period is therefore shorter than a slot and can be called a sub-slot. In the context of the 3GPP specification it is also referred to as a monitoring span (R1-1903817). Thus, there is a gap equal to the duration of a slot between the start of 2 consecutive monitoring spans. This kind of monitoring is more suitable for eMBB applications, where latency is not critical. A second type of monitoring allows more PDCCH monitoring instances and more monitoring spans during the slot, i.e. the time interval between the start of two consecutive monitoring sub-slots or monitoring spans is less than a slot and consequently there are multiple monitoring spans within the slot. The understanding of a "span" according to Rel-15 is e.g. described in R1-1903817. This capability reduces the latency and is therefore beneficial for URLLC applications. The gNB can configure PDCCH monitoring occasions at any symbol during the slot but they should fit into the UE's monitoring capability, otherwise the UE will not be able to detect them. In particular, the gNB can configure PDCCH monitoring occa-

BRIEF SUMMARY

For URLLC applications, the number of non-overlapping CCEs is in general not enough to ensure frequent PDCCH monitoring with sufficient reliability. In the case that a PDCCH is monitored every second symbol at SCS 15 kHz and that Aggregation Level (AL) 16 is needed in each monitoring instance to achieve sufficient reliability, channel estimation on 7*16 non-overlapping CCEs, i.e. 112 non-overlapping CCEs per slot has to be performed. However, Rel-15 has only support for 56 non-overlapping CCEs per slot. Therefore, RAN1 has agreed for Rel-16 to increase the number supported non-overlapping CCEs at least for one sub-carrier spacing.

Another factor that has impact on the complexity of PDCCH monitoring is the time separation between consecutive monitoring occasions. For UEs supporting case 2, i.e. a UE that can support multiple monitoring occasions during a slot (i.e. on sub-slot level), three different capabilities have been defined in the UE feature group description (R1-1907862) for Rel-15. The capabilities define different monitoring span combinations (X, Y) that a UE can report to support, X is the minimum separation between 2 consecutive spans counted in OFDM symbols and Y is the maximum duration of a span. A span duration is shorter than a slot, thus it is a sub-slot. The allowed span combinations in Rel-15 are {(7, 3)}, {(7, 3), (4, 3)} and {(7, 3), (4, 3), (2, 2)}.

A problem of the prior art solutions is that there are too few non-overlapping CCEs for channel estimation and possibly also too few BDs available per slot in order to perform PDCCH monitoring with a frequency, which is high enough for ensuring the low latency required for URLLC.

In the solution proposed in Rel-15 the limits on the number of non-overlapping CCEs and BDs are defined only per slot: a definition of the limits on the number of non-overlapping CCEs and/or BDs on a per sub-slot (span) basis is not given.

In Rel-16 the number of non-overlapping CCEs is increased and the limit on the number of a non-overlapping CCEs is defined on a per sub-slot basis but there is no limit on the number of non-overlapping CCE or BDs defined per slot.

The approach in Rel-16 might not cover all the legacy use cases, i.e. for some applications (or configurations), the legacy Rel15 behavior could turn out to be superior to the "enhanced Rel16 features". Thus, a Rel16-UE would not be fully backwards compatible with Rel-15 behavior.

Hence there is a need for methods and apparatus overcoming the above mentioned shortcomings.

An objective of embodiments of the invention is to provide a solution which mitigates or solves the drawbacks and problems of conventional solutions.

The above and further objectives are solved by the subject matter of the independent claims. Further advantageous embodiments of the invention can be found in the dependent claims.

According to a first aspect, the above mentioned and other objectives are achieved with a network node or a first communication device for performing control channel monitoring according to first mode or a second mode, in particular e.g. for monitoring and/or performing channel estimation on control channel elements (CCEs) and/or blind decodes (BDs). The network node is configured to obtain configuration information indicating the first mode and/or the second mode: and perform control channel monitoring based on the obtained configuration information.

For some use cases, where more control channel monitoring in the beginning of the slot is desired for system performance reasons, mode 1 may be advantageous, whereas for other use cases, where multiple monitoring occasions are needed within a slot, mode 2 may give better performance.

According to an implementation of the first aspect, in the first mode the network node is configured to perform control channel monitoring on a slot basis by monitoring a pre-defined number of time-frequency resources in a time slot and in the second mode the network node is configured to perform control channel monitoring on a sub-slot basis by monitoring a predefined number of time-frequency resources in a sub-slot.

According to an implementation of the first aspect, in the first mode the network node is configured to perform control channel monitoring on a slot basis by monitoring a pre-defined number of resources in a time slot. In the second mode the network node is configured to perform control channel monitoring on a sub-slot basis by monitoring a predefined number of resources in a sub-slot.

According to a further implementation of the first aspect, the network node is further configured to provide capability indication to a scheduling network node. The capability indication comprises information about a limit capability for control channel monitoring indicating limits associated to a first mode and/or a second mode monitoring. The configuration information is based on the provided capability indication.

According to a further implementation of the first aspect, the network node is further configured to provide capability indication to a scheduling network node. The capability indication comprises information about a limit capability for monitoring indicating limits associated to a first mode and/or a second mode monitoring. The configuration information is based on the provided capability indication.

According to a further implementation of the first aspect, the capability indication includes at least one of: a number of non-overlapping CCEs possible to process, e.g. for channel estimation: and a number of blind decodings possible for decoding.

According to a further implementation of the first aspect, the configuration information is at least one of an RRC message or a DCI message.

According to a further implementation of the first aspect, the network node is configured to obtain the RRC message at connection setup; or radio link reconfiguration: or handover signaling.

According to a further implementation of the first aspect, the network node is configured to perform control channel monitoring according to the non-default setting if the configuration information indicates a non-default setting, or according to a default setting otherwise.

According to a further implementation of the first aspect, the network node is configured to: determine whether the configuration information indicates a non-default setting, and perform control channel monitoring according to the non-default setting if the configuration information indicates a non-default setting, or according to a default setting otherwise.

According to a further implementation of the first aspect, the default setting is obtained from a pre-defined rule, in particular the pre-defined rule may be set in a standard and/or stored in the network node.

According to a further implementation of the first aspect, the default setting is the first mode.

According to a further implementation of the first aspect, the configuration information includes a configured service and/or traffic type, for example eMBB and/or URLLC traffic, and the network node is further configured to perform control channel monitoring according to the first or second mode based on the configured service and/or traffic type.

According to a further implementation of the first aspect, the configuration information includes at least one of a number and a time of monitoring occasions during which control channel monitoring can be performed and, the network node is further configured to perform control channel monitoring according to the first or second mode based on the number and/or time of the monitoring occasions.

According to a further implementation of the first aspect, the network node is configured to select one among the first mode or the second mode, with less control channel candidate dropping.

According to a second aspect, the above mentioned and other objectives are achieved with a second communication device or scheduling network node configured to obtain capability indication from a receiving network node. The capability indication comprises information about a limit capability for (control channel) monitoring indicating limits associated to a first mode and/or a second mode monitoring: and provide configuration information to the receiving network node, wherein the configuration information is based on the provided capability indication.

The above mentioned second device can configure the receiving network node with the monitoring mode that is expected to provide the best performance for the particular use case and/or deployment scenario.

According to an implementation of the second aspect, the configuration information includes a configuration of control channel monitoring occasions.

According to a further implementation of the second aspect, the configuration information includes an indication of the first mode or second mode monitoring.

According to a further implementation of the second aspect, in the first mode the control channel monitoring is performed on a slot basis by monitoring a predefined number of time-frequency resources in a time slot and in the second mode the control channel monitoring is performed on a sub-slot basis by monitoring a predefined number of time-frequency resources in a sub-slot.

According to a further implementation of the second aspect, in the first mode the control channel monitoring is performed on a slot basis by monitoring a predefined number of resources in a time slot and in the second mode the control channel monitoring is performed on a sub-slot basis by monitoring a predefined number of resources in a sub-slot.

According to a third aspect, the above mentioned and other objectives are achieved with a method for a receiving network node adapted to perform control channel monitoring according to a first mode or a second mode, in particular for monitoring control channel elements (CCEs) and/or blind decodes (BDs). The method comprises the steps of obtaining configuration information indicating the first mode and/or the second mode: and performing control channel monitoring based on the obtained configuration information.

This provides flexibility to the receiving mode, so that the control channel monitoring behavior can be adapted to the needs of the operated use case.

According to an implementation of the third aspect, in the first mode the control channel monitoring is performed on a slot basis by monitoring a predefined number of (time-frequency) resources in a time slot and in the second mode the control channel monitoring is performed on a sub-slot basis by monitoring a predefined number of (time-frequency) resources in a sub-slot.

According to an implementation of the third aspect, in the first mode the control channel monitoring is performed on a slot basis by monitoring a predefined number of resources in a time slot and in the second mode the control channel monitoring is performed on a sub-slot basis by monitoring a predefined number of resources in a sub-slot.

According to a further implementation of the third aspect, the method further comprises providing capability indication to a scheduling network node. The capability indication comprises information about a limit capability for (control channel) monitoring indicating limits associated to a first mode and/or a second mode monitoring. Further, the configuration information is based on the provided capability indication.

According to a further implementation of the third aspect, the method further comprises providing capability indication to a scheduling network node. The capability indication comprises information about a limit capability for monitoring indicating limits associated to a first mode and/or a second mode monitoring. Further, the configuration information is based on the provided capability indication.

According to a further implementation of the third aspect, the capability indication includes at least one of a number of non-overlapping CCEs possible to process, e.g. to perform channel estimation on: and a number of blind decodings possible for decoding.

According to a further implementation of the third aspect, the configuration information is at least one of an RRC message or a DCI message.

According to a further implementation of the third aspect, the method further comprises obtaining the RRC message at: connection setup; or radio link reconfiguration: or handover signaling.

According to a further implementation of the third aspect, the method further comprises determining whether the configuration information indicates a non-default setting, and performing control channel monitoring according to the non-default setting if the configuration information indicates a non-default setting, or according to a default setting otherwise.

According to a further implementation of the third aspect, the method further comprises performing control channel monitoring according to the non-default setting if the configuration information indicates a non-default setting, or according to a default setting otherwise.

According to a further implementation of the third aspect, the default setting is obtained from a pre-defined rule, in particular the pre-defined rule may be set in a standard and/or stored in the network node.

According to a further implementation of the third aspect, the default setting is the first mode.

According to a further implementation of the third aspect, the method further comprises the configuration information includes a configured service and/or traffic type, for example eMBB and/or URLLC traffic. The method further includes performing control channel monitoring according to the first or second mode based on the configured service and/or traffic type.

According to a further implementation of the third aspect, the configuration information includes at least one of a number and a time of monitoring occasions during which control channel monitoring can be performed. The method further includes performing control channel monitoring according to the first or second mode based on the number and/or time of the monitoring occasions.

According to a further implementation of the third aspect, the method further comprises selecting one among the first mode or the second mode, with less control channel candidate dropping.

According to a fourth aspect, the above mentioned and other objectives are achieved with a method for a scheduling network node comprising the steps of obtaining capability indication from a receiving network node, wherein the capability indication comprises information about a limit capability for (control channel) monitoring indicating limits associated to a first mode and/or a second mode monitoring: and providing configuration information to the receiving network node, wherein the configuration information is based on the provided capability indication.

According to an implementation of the fourth aspect the configuration information includes a configuration of control channel monitoring occasions.

According to a further implementation of the fourth aspect, the configuration information includes an indication of the first mode or second mode monitoring.

According to a further implementation of the fourth aspect, in the first mode the control channel monitoring is performed on a slot basis by monitoring a predefined number of (time-frequency) resources in a time slot and in the second mode the control channel monitoring is performed on a sub-slot basis by monitoring a predefined number of resources in a sub-slot.

According to a further implementation of the fourth aspect, in the first mode the control channel monitoring is performed on a slot basis by monitoring a predefined number of resources in a time slot and in the second mode the control channel monitoring is performed on a sub-slot basis by monitoring a predefined number of resources in a sub-slot.

The invention also relates to a computer program, characterized in program code, which when run by at least one processor causes said at least one processor to execute any method according to embodiments of the invention.

Further, the invention also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

DETAILED DESCRIPTION

Control Channel Monitoring

Figure 2:
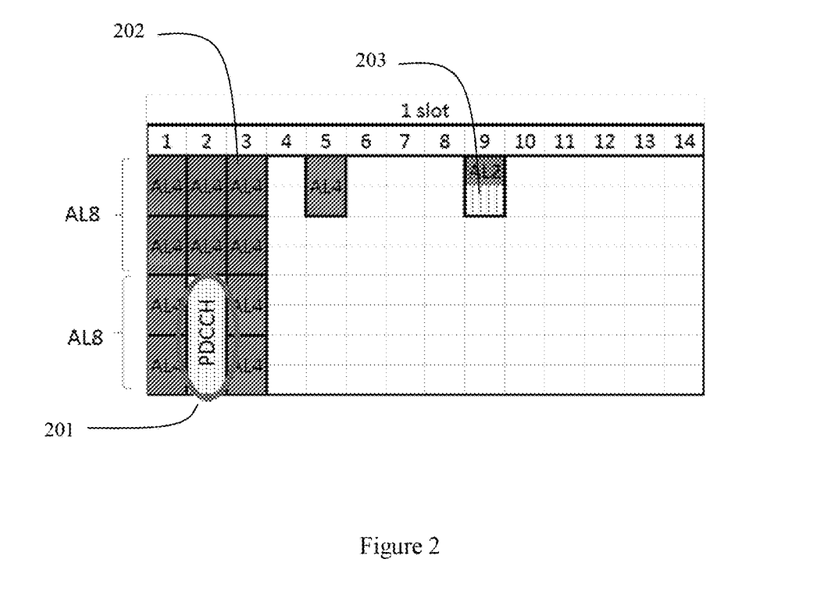
FIG. 2 illustrates an example of a configuration for PDCCH transmission and channel monitoring.

FIG. 2 shows a possible configuration for PDCCH transmission and channel monitoring. Although the following description will refer to PDCCH transmissions between a UE and a gNB, i.e. transmission on the Uu link, this is only for explicative purposes. The concepts outlined below also apply to other type of transmissions, for instance transmissions on the side link between two communication devices (for instance over the PC5 interface), where a first communication device may have the function of a scheduling device and a second communication device may be a client device. Similarly, although reference might be made to elements of a network in New Radio (NR), the concepts described below also apply to other wireless networks using the same resource configuration described below.

A PDCCH is transmitted on control channel elements (CCEs). In NR, either 1, 2, 4, 8 or 16 CCEs can be used for the transmission of one PDCCH. The number of CCEs being used for the transmission is called the aggregation level (AL). A CCE may consist of 6 resource element groups, where each group has the size of one Physical Resource Block (PRB) in one OFDM symbol. This is, for instance, the case in NR. The scheduling device, for instance the gNB, may configure the client device, for instance a UE, with search spaces consisting of multiple CCEs. The gNB can select the AL dynamically based on the radio conditions and the required reliability of the PDCCH reception and then transmit the PDCCH on a sub-set out of the configured CCEs in a search space. Higher aggregation levels may be used in case more redundancy is needed in the coding in order to ensure the correct decoding of a PDCCH candidate at the UE side.

The PDCCH(s) are expected to be transmitted within the configured search spaces. This is illustrated in FIG. 2. The lined fields show an example of the configured search space 202 and the dotted fields indicate the sub-set of CCEs used for the PDCCH transmission. In this example a first PDCCH 201 is transmitted on 8 CCEs in Orthogonal Symbol (OS) number 2 (OS #2), and a second PDCCH 203 is transmitted on 2 CCEs in OS #9.

The UE is not aware whether the gNB is transmitting a PDCCH or not. Further, when the gNB is transmitting the PDCCH, the UE is also not aware of which sub-set of CCEs is used. In order to identify whether a PDCCH is transmitted and to decode the conveyed information, the UE may be configured to check all possible CCE combinations in the search space 202 in a blind detection procedure. The blind detection procedure comprises two steps: (i) channel estimation on the CCEs and (ii) blind decoding. In the example illustrated in FIG. 2, the UE has been configured with PDCCH candidates of AL8 and AL4 in the search space spanning the first 3 symbols in the slot. As this search space consists of 48 non-overlapping CCEs, the UE would then need to perform channel estimation on 48 non-overlapping CCEs. In each configured possible CCE position for a candidate PDDCH, the UE performs a decoding attempt to identify if a PDCCH has been transmitted. Each decoding attempt is counted as one blind decode.

Embodiments of the invention resolve the above described problem which may occur in Rel-16. In particular, according to embodiments of the invention the UE or in general a receiving network node, is allowed to support all use cases with at least the same performance as a Rel-15 UE, and in addition, it will outperform the Rel-15 UE in typical URLLC scenarios.

Figure 3:
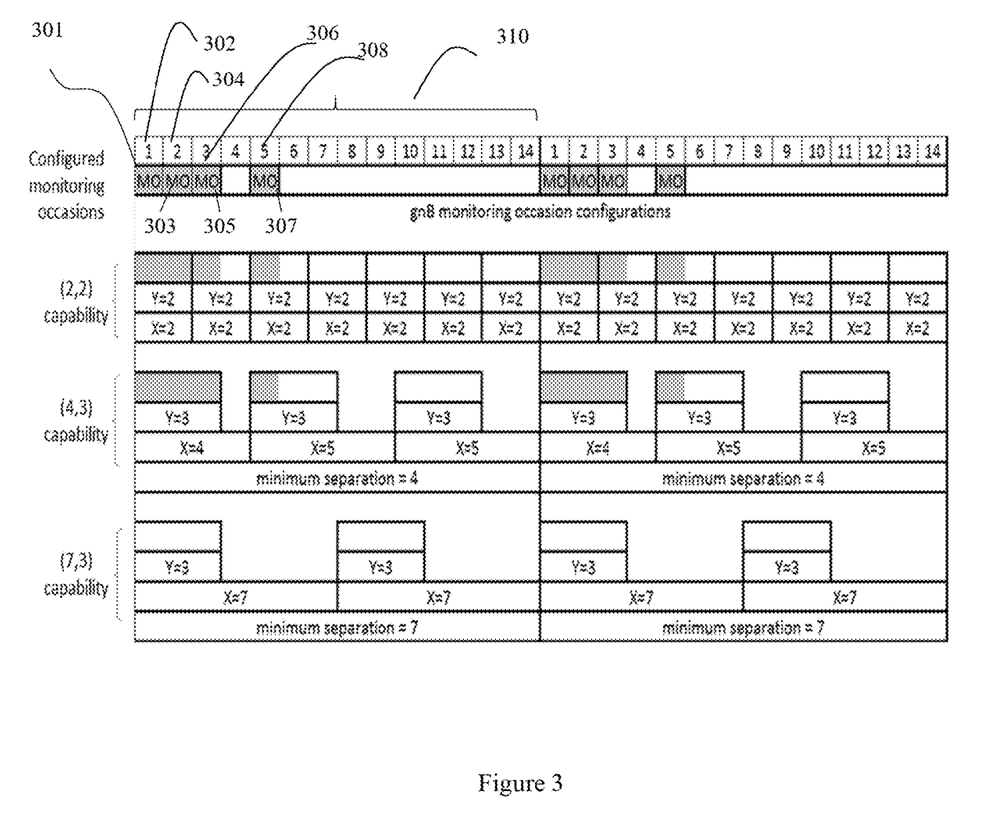
FIG. 3 illustrates different monitoring spans and their capability to support certain monitoring occasions, in accordance with certain embodiments of this disclosure.

A further example of embodiments described in this disclosure is illustrated below with reference to FIG. 3.

The gNB may configure 3 monitoring occasions (MO) 301, 303, 305 (indicated by the solid boxes) in the first 3 symbols of a slot 310 and a further monitoring occasion 307 in the 5th symbol.

In other words, the scheduling network node may configure a first monitoring occasion 301 in a first symbol 302, a second monitoring occasion 303 in a second symbol 304, a third monitoring occasion 305 in a third symbol 306 and a fourth monitoring occasion 307 in a fourth symbol 308 of the slot 310.

A UE that supports monitoring span combinations (2, 2) according to the definition in R1-1903817, i.e. spans with a minimum separation of 2 symbols between the start of consecutive monitoring spans and a maximum duration of 2 OSs for each span, or (4, 3) would satisfy this gNB configuration, whereas a UE that only has support for (7, 3) would not be able to satisfy this configuration for blind decoding.

In Rel-15, the number of non-overlapping CCEs is limited per slot. Therefore, the available non-overlapping CCEs per slot (e.g. 56 for 15 kHz subcarrier spacing) can be freely distributed among the spans.

According to embodiments the number of non-overlapping CCEs as given in Rel-16 is increased in order enable more frequent PDCCH monitoring with sufficient reliability.

For example, the number of non-overlapping CCEs per slot as given in Rel-16 is increased in order enable more frequent PDCCH monitoring with sufficient reliability.

Furthermore, the number of available BDs may also be increased. A limit "C", for example a limit capability, for the non-overlapping CCEs supported per monitoring span is given. The limit "C" per span allows to keep the UE implementation complexity low. Since there are multiple spans in a slot, the PDCCH monitoring capability can be increased compared to Rel-15. However, for one span, the limit "C" might be smaller than what is available for the entire slot in Rel-15. Since in Rel-15 the non-overlapping CCEs can be freely distributed across the different spans, there may be configurations for the same monitoring span set-up, where a Rel-15 UE could perform channel estimation on more non-overlapping CCEs than what would be possible with a Rel-16 UE. This would cause backward compatibility issues and shall be avoided. In Rel-16 a non-overlapping CCE limit is currently only defined per span, whereas in Rel-15 a limit is only defined per slot. These different time references that are used for the non-overlapping CCE limits can lead to backwards compatibility problems.

As an example assume that the numbers in Table 2 may be adopted to define the CCE limits per span.

TABLE 2

Example numbers for non-overlapping CCEs supported per span for subcarrier spacing 15 kHz, 30 kHz, 60 kHz and 120 kHz

| | | | C | | |
|---|---|---|---|---|---|
| X | Y | 15 kHz | 30 kHz | 60 kHz | 120 kHz |
| Combination 1 | 2 | 2 | 16 | 16 | 12 | 8 |
| Combination 2 | 4 | 3 | 36 | 36 | 32 | 20 |
| Combination 3 | 7 | 3 | 56 | 56 | 48 | 32 |

The example numbers from Table 2 above translate into many more supported non-overlapping CCEs per slot for Rel-16 compared to Rel-15. Thus, counted over one slot, the PDCCH monitoring is enhanced for most configurations. This is shown in Table 3 below. However, the limit per span is smaller than the limit per slot in Release 15.

TABLE 3

Example for possible number of non-overlapping CCEs per slot in Rel 16.

| | Rel 15 non-overlapping | Non-overlapping CCEs/slot for enhanced monitoring | | |
|---|---|---|---|---|
| SCS | CCEs/slot | (2, 2) | (4, 3) | (7, 3) |
| 15 kHz | 56 | 16*7 = 112 | 36*3 = 108 | 56*2 = 112 |
| 30 kHz | 56 | 16*7 = 112 | 36*3 = 108 | 56*2 = 112 |
| 60 kHz | 48 | 12*7 = 84 | 32*3 = 96 | 48*2 = 96 |
| 120 kHz | 32 | 8*7 = 56 | 20*3 = 60 | 32*2 = 96 |

The above solution would work fine for typical URLLC use cases, frequent monitoring occasions can be supported.

Figure 4:
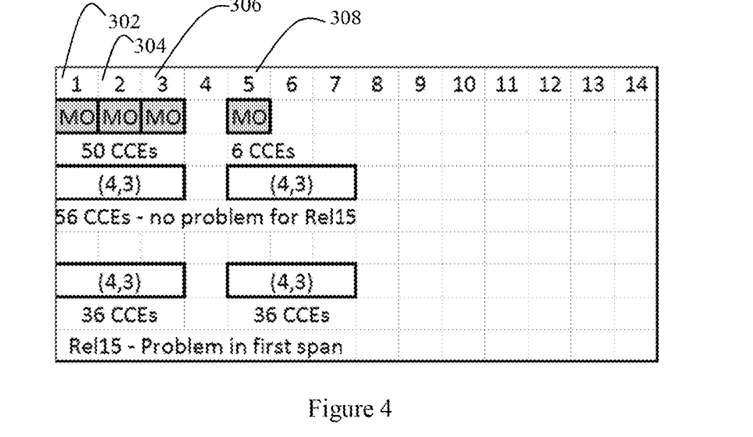
FIG. 4 illustrates a monitoring configuration that results in better Rel15 performance than Rel16 performance, in accordance with certain embodiments of this disclosure.

A further example is given below as illustrated in FIG. 4. For illustrative purposes only it is assumed that the gNB configures 50 non-overlapping CCEs in the first 3OS (OS1-3) 302, 304, 306 and then another 6 non-overlapping CCEs in OS #5 308, for a Sub-Carrier Spacing (SCS) of 30 KHz. This is satisfied with the (4, 3) span pattern. However, a Rel-16 UE with a limit of less than non-overlapping 50 CCEs per span, would have problems to handle it. It would need to drop PDCCH candidates which will result in worse performance than a Rel15 UE.

Embodiments described herein allow a Rel16 UE to switch back to the PDCCH monitoring based on slot limits as it is performed in Rel15.

The difference between Rel-15 and Rel-16 is how the limits of the maximum number of non-overlapping CCEs are applied. In Rel15 the limit is only applied on a slot basis whereas in Rel-16, so far, the limit is only applied on a span or per sub-slot basis. The Rel-16 UE, according to the current status of the specification has no possibility to switch back to Rel-15 mode.

According to an embodiment two limits for the maximum number of non-overlapping CCEs are defined, wherein a first limit is applied on a slot basis, and a second limit is applied on a sub-slot, or monitoring span, basis. A monitoring span according to the Rel-15 definition is a type of sub-slot, where its duration is shorter than a slot. The span limit can be smaller or equal to the limit on the slot basis. And one of the limits or both can be applied for PDCCH monitoring.

Note that the discussion in this disclosure uses the non-overlapping CCE as an example. However, the same approach can also be taken on other limits such as the Blind Decodings (BDs). For illustrative purposes, the following example will be described with reference to the number of non-overlapping CCEs. However, the limits on the configurations for channel monitoring can also be applied to different parameters, such as the number of BDs.

The limits for the maximum number of non-overlapping CCEs and/or the other limits mentioned above may be an example of limit capability for control channel monitoring.

In a possible realization the UE may directly report the number of CCEs that can be supported.

As possible alternative to directly reporting the number of CCE, the UE may notify that it can support enhanced control channel monitoring, e.g. PDCCH monitoring, for a given sub-carrier spacing (X) and span pattern (Y). Support of enhanced control channel monitoring can be done by means of a dedicated signalling or by setting a flag or a bit(s) field in an existing message. In this case, the number of CCEs to be supported for enhanced control channel monitoring may be pre-determined, for instance hard-coded in the specification.

Figure 5:
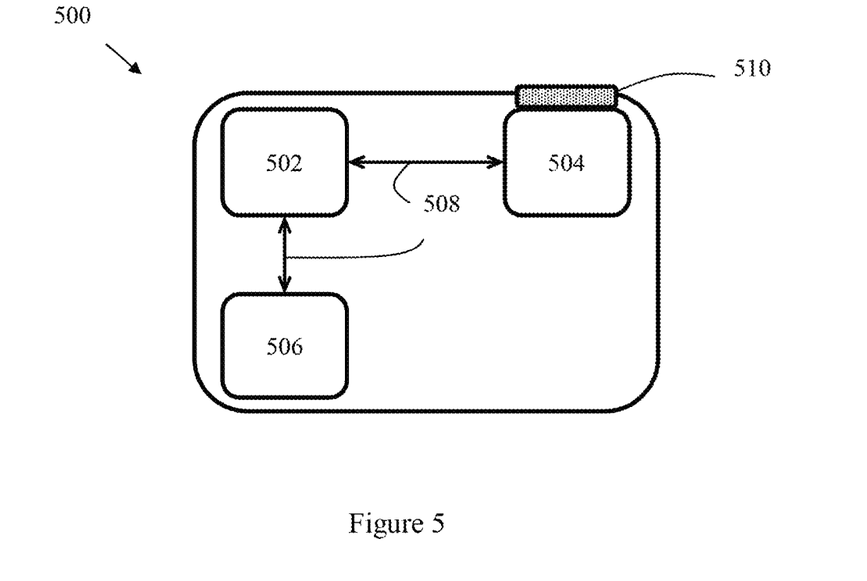
FIG. 5 illustrates a first network node according to an example.

FIG. 5 shows a first communication device or (receiving) network node 500 referred to in this disclosure. The first communication device 500 comprises a processor 502, a transceiver 504 and a memory 506. The processor 502 is coupled to the transceiver 504 and the memory 506 by communication means 508 known in the art. The first client device 500 further comprises an antenna or antenna array 510 coupled to the transceiver 504, which means that the communication device 500 is configured for wireless communications in a wireless communication system. That the first communication device 500 is configured to perform certain actions can in this disclosure be understood to mean that the first communication device 500 comprises suitable means, such as e.g. the processor 502 and the transceiver 504, configured to perform said actions.

According to embodiments, the network node is adapted to perform control channel monitoring according to first mode or a second mode. In particular, e.g. the network node is adapted to perform monitoring and/or channel estimation on control channel elements (CCEs) and/or blind decodes (BDs). The network node is configured to obtain configuration information indicating the first mode and/or the second mode. Further the network node perform control channel monitoring based on the obtained configuration information.

According to an embodiment the invention relates to a receiving network node, such as a UE, that is capable of performing control channel monitoring at least according to a first (monitoring) mode and a second (monitoring) mode. In the first (monitoring) mode, the UE may be configured with a limit on the number of non-overlapping CCEs on a slot basis (e.g. mode 1). In the second (monitoring) mode, the UE may be configured with a non-overlapping CCE limit on a monitoring span basis (e.g. mode 2). The limit may also be indicated as limit capability.

According to one embodiment, the UE may report its capability, i.e. the span combinations it can support and the associated limits of non-overlapping CCEs per span for channel monitoring, to a scheduling network node. The capability may also be indicated as limit capability. Alternatively, or in addition, the UE may then provide configuration information to the scheduling network node, wherein the configuration information includes an indication whether the UE can perform control channel monitoring according to mode 1, mode 2, or both modes.

The capability and/or the configuration information may either be reported directly for example by means of a dedicated message or dedicated scheduling, or it may be included in other parameters, e.g. when the UE is reporting a set of features and the control channel monitoring is one of the features.

Figure 6:
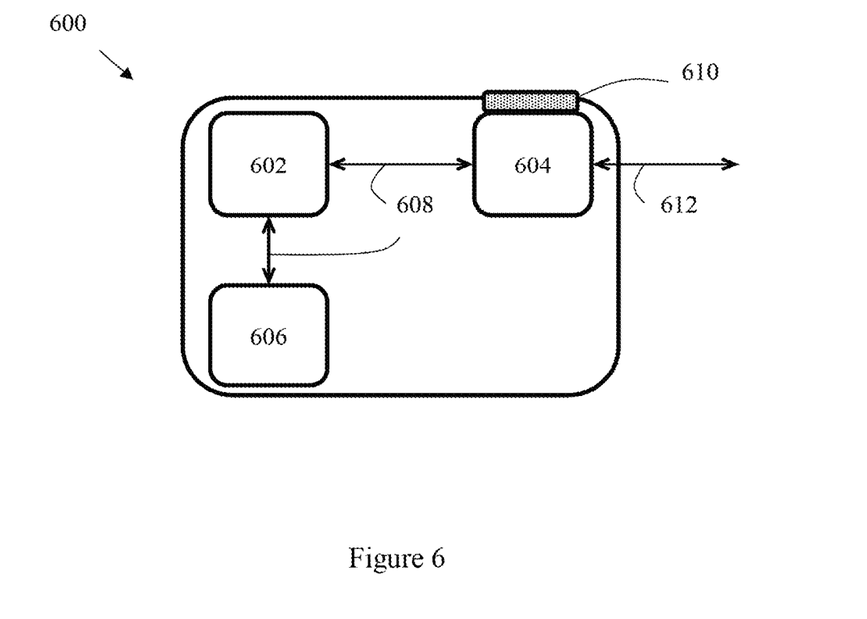
FIG. 6 illustrates a second network node or scheduling network node according to an example.

FIG. 6 shows a scheduling network node or second network node 600. The second network node 600 comprises a processor 602, a transceiver 604 and a memory 606. The processor 602 is coupled to the transceiver 604 and the memory 606 by communication means 608 known in the art. The network access node 600 may be configured for both wireless and wired communications in wireless and wired communication systems, respectively. The wireless communication capability is provided with an antenna or antenna array 610 coupled to the transceiver 604, while the wired communication capability is provided with a wired communication interface 612 coupled to the transceiver 604. That the second network node 600 is configured to perform certain actions can in this disclosure be understood to mean that the second network node 600 comprises suitable means, such as e.g. the processor 602 and the transceiver 604, configured to perform said actions. The second network node may be, in some examples a gNB. For ease of explanation, the disclosure describes examples where the second network node is a gNB. It should be clear, however, that any device capable of performing and or managing scheduling may also be suitable to realize the concepts described hereinafter and, in general, in the whole document.

Once the gNB knows the control channel capability of the UE, it may set up the monitoring occasions according to the reported capability and/or the configuration information so that the UE capabilities are utilized to improve the performance for the intended use case. For example, the gNB may know that a particular UE is capable of control channel monitoring mode 1 and mode 2. In the case that the gNB sends eMBB data, (typically characterized by relaxed latency requirements), then the gNB can configure monitoring occasions, which would be met by mode 1 (mode 1 is assumed to result in better performance than mode 2 for this particular use case). On the other hand, if the gNB has URLLC data to send, the gNB can configure monitoring occasions that would be satisfied by mode 2 (mode 2 is assumed to result in better performance than mode 1 for this particular use case).

The UE may obtain the information indicating which monitoring mode can be applied. The decision about the monitoring mode to apply may be done upon obtaining an instruction from the gNB. Alternatively, this decision may be taken autonomously by the UE. The UE should be able to apply only one of the modes or also all of the modes.

In an embodiment, the UE may be instructed by the gNB about the mode to use. In this case this information may for example be conveyed in the message for the configuration of the search spaces (i.e. the monitoring mode is configured semi statically) or in other way the monitoring mode can be switched dynamically with control information, such as DCI.

According to a further embodiment, the configuration mode could be implicit. For example, the UE may report capability of mode 1 and mode 2, but it may not receive or is not provided with any configuration or indication about the mode to use (mode 1, mode 2). In this case the UE may assume a default monitoring mode. The default monitoring could be one among mode 1 and mode 2 or both modes together.

According to an alternative implementation for selecting the monitoring mode, the UE may take an autonomous decision based on predefined rules. This decision may, for example, be based on the received monitoring occasions or search spaces. For example, the UE may select the mode that satisfies the received monitoring configuration with the best performance. Best performance may in some embodiments mean least number of PDCCH candidates dropped. According to another implementation, the UE may always monitor according to both modes.

According to an alternative implementation, selection of the monitoring configuration may be based on the traffic type. If the UE has information about the traffic type that it is receiving (e.g. URLLC or eMBB), it could e.g. select mode 1 if it monitoring eMBB traffic and mode 2 for URLLC traffic.

To clarify the concepts described above, the difference between Rel-15 based and Rel-16-based case 2 (mode 2) monitoring is that in Rel-15, the number of non-overlapping CCEs is limited on a slot basis and when this number is exceeded, PDCCH candidate dropping is performed. In Rel-16, on the other hand, the maximum number of non-overlapping CCEs would be limited on a span (sub-slot) basis. A receiving network node, for example a UE, compatible with Rel-16 and capable of enhanced PDCCH monitoring would be able to perform more channel estimations per slot and can therefore better support frequent PDCCH monitoring to achieve low latency. However, in order to achieve this with reasonable implementation cost an assumption can be made on the maximum supportable number of non-overlapping CCEs per span. This number can be smaller than the total number of non-overlapping CCEs that could be supported over the entire slot. For example, a possible configuration for span combination (4, 3) at 30 kHz SCS may be 36 non-overlapping CCEs. This translates to 108 non-overlapping CCEs per slot and is almost doubling the Rel-15 capability. However, in scenarios where in one span more monitoring or channel estimation on non-overlapping CCEs is desired than the Rel-16 span limit would allow, then the slot based non-overlapping CCE limitation according to Rel-15 could offer more scheduling flexibility and better performance.

Enhanced PDCCH monitoring with non-overlapping CCE limitation per span allows for better support of frequent PDCCH monitoring to achieve low latency. But there can be configurations that typically are not for URLLC applications that can be satisfied more efficiently with slot based non-overlapping CCE limitation according to Rel-15.

According to embodiments of the invention, a Rel-16 UE with enhanced PDCCH monitoring capability is capable of supporting all PDCCH monitoring configurations at least with the same performance as a Rel-15 UE with case 2 capability. A simple approach to achieve this may be to allow two PDCCH monitoring modes, a first mode with a slot-based limit on the number of non-overlapping CCEs according to the Rel-15 and a second mode with a span-based limit on the number of non-overlapping CCEs. The gNB may then configure the UE which mode to use.

According to a further embodiment, a Rel-16 UE that supports enhanced PDCCH monitoring with non-overlapping CCE limit per monitoring span is provided, which is also able to operate in Rel-15 mode with non-overlapping CCE limit per slot. The gNB can for example configure one of the two PDCCH monitoring modes.

The receiving network node and/or the scheduling network node (also denoted first communication device and second communication device) herein, which may be denoted as a user device, a User Equipment (UE), a mobile station, an internet of things (IOT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

However, the receiving network node and/or the scheduling network node (first communication device and/or the second communication device) herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the first communication device and the second communication device comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the solution.

Especially, the processor(s) of the first communication device and the second communication device may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the invention is not limited to the embodiments described above, but also relates to and incorporates all embodiments within the scope of the appended independent claims.

What is claimed is:

1. A network node for performing control channel monitoring, the network node comprising:
   a memory storing instructions; and
   a processor coupled to the memory,
   wherein when the processor executes the instructions, the network node is configured to:
     obtain configuration information, the configuration information indicating a first mode or a second mode or without indicating a mode; and
     perform control channel monitoring based on the configuration information if the first mode or the second mode is indicated,
   wherein when the configuration information indicating the first mode, the network node is configured to perform the control channel monitoring on a slot basis by monitoring a predefined number of resources in a time slot,
   wherein when the configuration information indicating the second mode, the network node is configured to perform control channel monitoring on a span basis by monitoring a predefined number of resources in a sub-slot,
   wherein the network node is configured to perform the control channel monitoring according to a default setting if the configuration information is obtained without an indication of the mode, and wherein the default setting is pre-defined.

2. The network node according to claim 1, wherein the network node is further configured to:
provide capability indication to a scheduling network node, the capability indication comprising information about a limit capability for control channel monitoring indicating limits associated with one or more of a first mode monitoring or a second mode monitoring, wherein the configuration information is based on the provided capability indication.

3. The network node according to claim 2, wherein the capability indication comprises at least one of:
a number of non-overlapping Control Channel Elements (CCEs) possible to process; and
a number of blind decodings possible for decoding.

4. The network node according to claim 1, wherein the configuration information is at least one of a Radio Resource Control (RRC) message or a Downlink Control Information (DCI) message.

5. The network node according to claim 4, wherein when the configuration information is the RRC message, the network node obtains the RRC message at one of:
connection setup;
radio link reconfiguration; or
handover signaling.

6. The network node according to claim 1, wherein the default setting is the first mode.

7. The network node according to claim 1, wherein:
the configuration information includes one or more of a configured service or a traffic type; and
the network node is further configured to perform the control channel monitoring according to the first mode or the second mode based on one or more of the configured service or the traffic type.

8. The network node according to claim 1, wherein:
the configuration information includes at least one of a number and a time of monitoring occasions during which the control channel monitoring can be performed, and
the network node is further configured to perform the control channel monitoring according to the first mode or the second mode based on one or more of the number or time of the monitoring occasions.

9. The network node according to claim 8, wherein the network node is configured to select one of the first mode or the second mode based on control channel candidate dropping.

10. The network node according to claim 1, wherein a monitoring period of a span is less than a monitoring period of a slot.

11. The network node according to claim 1, wherein the default setting is the second mode.

12. The network node according to claim 1, wherein the default setting is a combination of the first mode and the second mode.

13. A scheduling network node comprising:
a memory storing instructions; and
a processor coupled to the memory,
wherein when the processor executes the instructions, the scheduling network node is configured to:
provide configuration information to a receiving network node, the configuration information indicating a first mode or a second mode or without indicating a mode, wherein the configuration information is based on the provided capability indication, wherein, in the first mode monitoring, the control channel monitoring is performed on a slot basis by monitoring a predefined number of resources in a time slot, wherein, in the second mode monitoring, the control channel monitoring is performed on a span basis by monitoring a predefined number of resources in a sub-slot, wherein the control channel monitoring is performed according to a default setting if the configuration information is provided without an indication of the mode, and wherein the default setting is pre-defined.

14. The scheduling network node according to claim 13, wherein the configuration information includes a configuration of control channel monitoring occasions.

15. The scheduling network node according to claim 13, wherein the configuration information includes an indication of the first mode monitoring or the second mode monitoring.

16. The scheduling network node according to claim 13, wherein a monitoring period of a span is less than a monitoring period of a slot.

17. The scheduling network node according to claim 13, wherein the default setting is the second mode, or a combination of the first mode and the second mode.

18. A method for a receiving network node adapted to perform control channel monitoring, the method comprising:
obtaining configuration information, the configuration information indicating a first mode or a second mode or without indicating a mode; and
performing control channel monitoring based on the configuration information if the first mode or the second mode is indicated,
wherein, in the first mode, the control channel monitoring is performed on a slot basis by monitoring a predefined number of resources in a time slot,
wherein, in the second mode, the control channel monitoring is performed on a span basis by monitoring a predefined number of resources in a sub-slot,
wherein the control channel monitoring is performed according to a default setting if the configuration information is obtained without an indication of the mode, and
wherein the default setting is pre-defined.

19. The method according to claim 18, further comprising:
providing capability indication to a scheduling network node, the capability indication comprising information about a limit capability for control channel monitoring indicating limits associated to one or more of a first mode monitoring or a second mode monitoring, wherein the configuration information is based on the provided capability indication.

20. The method according to claim 19, wherein the capability indication comprises one or more of:
a number of non-overlapping Control Channel Elements (CCEs) possible to process; and
a number of blind decodings possible for decoding.

21. The method according to claim 19, wherein the configuration information is at least one of a Radio Resource Control (RRC) message or a Downlink Control Information (DCI) message.

22. The method according to claim 21, wherein the RRC message is obtained during one of:
connection setup;
radio link reconfiguration: or
handover signaling.

23. The method according to claim 18, wherein the pre-defined default setting comprises one or more of set in a standard or stored in the network node.

24. The method according to claim 18, wherein the default setting is the first mode.

25. The method according to claim 18, wherein
the configuration information comprises one or more of a configured service or traffic type, and
wherein the method further comprises performing control channel monitoring according to the first or second mode based on the configured service and/or traffic type.

26. The method according to claim 18, wherein the configuration information comprises at least one of a number and a time of monitoring occasions during which control channel monitoring can be performed, and
wherein the method further comprises performing control channel monitoring according to the first mode or the second mode based on at least one of the number and time of the monitoring occasions.

27. The method according to claim 26, further comprising selecting one among the first mode or the second mode based on control channel candidate dropping.

28. The method according to claim 18, wherein a monitoring period of a span is less than a monitoring period of a slot.

29. A method for a scheduling network node comprising:
providing configuration information to a receiving network node, the configuration information indicating a first mode or a second mode or without indicating a mode, wherein the configuration information is based on the provided capability indication,
wherein, in the first mode monitoring, the control channel monitoring is performed on a slot basis by monitoring a predefined number of resources in a time slot,
wherein, in the second mode monitoring, the control channel monitoring is performed on a span basis by monitoring a predefined number of resources in a sub-slot,
wherein the control channel monitoring is performed according to a default setting if the configuration information is provided without an indication of the mode, and
wherein the default setting is pre-defined.

30. The method according to claim 29, wherein the configuration information comprises a configuration of control channel monitoring occasions.

31. The method according to claim 29, wherein the configuration information comprises an indication of the first mode monitoring or the second mode monitoring.

32. The method according to claim 29, wherein a monitoring period of a span is less than a monitoring period of a slot.

* * * * *